US009597819B2

(12) United States Patent
Kondo et al.

(10) Patent No.: US 9,597,819 B2
(45) Date of Patent: Mar. 21, 2017

(54) METHOD FOR CUTTING HIGH-HARDNESS MATERIAL BY MULTI-WIRE SAW

(71) Applicant: HITACHI METALS, LTD., Minato-ku, Tokyo (JP)

(72) Inventors: Sadahiko Kondo, Mishima-gun (JP); Akira Miyachi, Mishima-gun (JP); Toshihiko Hatanaka, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/423,471

(22) PCT Filed: Aug. 30, 2013

(86) PCT No.: PCT/JP2013/073292

§ 371 (c)(1),
(2) Date: Feb. 24, 2015

(87) PCT Pub. No.: WO2014/034841

PCT Pub. Date: Mar. 6, 2014

(65) Prior Publication Data

US 2015/0183132 A1 Jul. 2, 2015

(30) Foreign Application Priority Data

Sep. 3, 2012 (JP) ................................ 2012-193150

(51) Int. Cl.
*B28D 5/04* (2006.01)
*B28D 1/08* (2006.01)
(Continued)

(52) U.S. Cl.
CPC ......... *B28D 5/045* (2013.01); *B23D 57/0007* (2013.01); *B23D 61/185* (2013.01); *B28D 1/08* (2013.01)

(58) Field of Classification Search
CPC ... B28D 1/06; B28D 1/08; B28D 5/04; B28D 5/042; B28D 5/045; B23D 61/18;
(Continued)

(56) References Cited

U.S. PATENT DOCUMENTS 5,699,782 A * 12/1997 Toyama ............ B23D 57/0053 125/16.01
5,810,643 A * 9/1998 Toyama ............ B23D 57/0046 125/21
(Continued)

FOREIGN PATENT DOCUMENTS

JP 3043465 U 11/1997
JP 2001-232548 A 8/2001
(Continued)

OTHER PUBLICATIONS

Official Communication issued in International Patent Application No. PCT/JP2013/073292, mailed on Nov. 12, 2013.

*Primary Examiner* — Eileen Morgan
(74) *Attorney, Agent, or Firm* — Keating & Bennett, LLP

(57) ABSTRACT

This method of cutting a high-hardness material with a multi-wire saw includes the steps of: (A) providing at least one ingot which includes a body portion 10*a* with two ends and a low-quality crystal portion 10*e* that is located at only one of the two ends of the body portion; (B) fixing the at least one ingot onto a fixing base; and (C) slicing the at least one ingot by moving the ingot with respect to a saw wire so that the saw wire does not contact with the low-quality crystal portion 10*e* of the at least one ingot but does contact with its body portion 10*a*.

10 Claims, 10 Drawing Sheets

(51) Int. Cl.
*B23D 61/18* (2006.01)
*B23D 57/00* (2006.01)

(58) Field of Classification Search
CPC .............. B23D 61/185; B23D 57/0007; B23D 57/0023
USPC ............................................... 125/16.01, 125
See application file for complete search history.

(56) References Cited

U.S. PATENT DOCUMENTS 5,896,851 A * 4/1999 Katamachi ............. B28D 5/045 125/16.02
6,056,031 A * 5/2000 Banzawa ............. B28D 5/0082 125/16.01
6,178,962 B1 * 1/2001 Ohashi ............... B23D 57/0053 125/12
6,408,840 B2 * 6/2002 Ishida ....................... B24B 5/00 125/16.01
6,568,384 B1 * 5/2003 Onizaki ................. B28D 5/007 125/16.02
6,941,940 B1 * 9/2005 Zavattari ............ B23D 57/0061 125/16.02
2001/0042299 A1 * 11/2001 Chikuba ................. B22F 5/003 29/557
2005/0155595 A1 * 7/2005 Kondo ............... B23D 57/0053 125/21
2005/0217656 A1 * 10/2005 Bender ................ B28D 5/0082 125/21
2006/0060180 A1 * 3/2006 Nakashima .......... B28D 5/0082 125/21
2006/0249135 A1 * 11/2006 Matsumoto ............ B28D 5/045 125/21
2007/0023027 A1 * 2/2007 Nakai ................ B23D 57/0061 125/21
2010/0037880 A1 * 2/2010 Kawasaki .............. B28D 5/007 125/16.02
2010/0089209 A1 4/2010 Rieger et al.
2010/0089377 A1 * 4/2010 Oishi .................. B28D 5/0064 125/16.02
2010/0126489 A1 * 5/2010 Bakshi ...................... B08B 3/02 125/16.02
2010/0180880 A1 * 7/2010 Oishi ................ B23D 57/0046 125/16.02
2010/0197202 A1 * 8/2010 Branagan ............. B23D 61/185 451/36
2010/0252017 A1 * 10/2010 Kitagawa ............ B24B 27/0633 125/16.01
2010/0258103 A1 * 10/2010 Kitagawa ............ B24B 27/0633 125/21
2011/0059679 A1 * 3/2011 Kitagawa ............ B24B 27/0633 451/1
2011/0126813 A1 * 6/2011 Hodsden ............ B23D 57/0053 125/16.02
2011/0163326 A1 * 7/2011 Matsumoto ............. C30B 25/20 257/76
2012/0255535 A1 * 10/2012 Tagami .................. B28D 5/007 125/21
2014/0150766 A1 * 6/2014 Che ..................... B24B 27/0633 125/16.02
2015/0202700 A1 * 7/2015 Kondo ................... B28D 5/045 125/16.01

FOREIGN PATENT DOCUMENTS

JP 2003-039301 A 2/2003
JP 2003-292399 A 10/2003
JP 2007-118401 A 5/2007
JP 2007-194418 A 8/2007
JP 2009-186181 A 8/2009
JP 2009-202406 A 9/2009

* cited by examiner (a)

(b)

14
10
57
50
51a
51r
51b

10f
M1
50
L1
51r
10a
10e
10

METHOD FOR CUTTING HIGH-HARDNESS MATERIAL BY MULTI-WIRE SAW

TECHNICAL FIELD

The present invention relates to a method of cutting a high-hardness material with a multi-wire saw, and more particularly relates to a method of cutting a silicon carbide semiconductor material with a multi-wire saw.

BACKGROUND ART

Recently, silicon carbide semiconductors have attracted a lot of attention as a new type of semiconductor materials. Silicon carbide semiconductors have a greater dielectric breakdown voltage, a higher electron saturated drift velocity, and a higher thermal conductivity than silicon semiconductors. For that reason, researches and developments have been carried on extensively to realize, using those silicon carbide semiconductors, power devices which can operate at higher temperatures, at higher speeds and with a larger amount of current supplied than conventional silicon devices. Among other things, since motors for use in electric motorcycles, electric cars and hybrid cars are either AC driven or inverter-controlled, development of high-efficiency switching elements for use in those applications is awaited by many people. To realize such a power device, a single-crystal silicon carbide wafer is needed to grow epitaxially a silicon carbide semiconductor layer of quality thereon.

A single crystal semiconductor wafer is generally obtained by slicing a block of a single-crystal semiconductor material which is called either an "ingot" or a "rod" with a multi-wire saw (see Patent Document No. 1, for example).

CITATION LIST

Patent Literature

Patent Document No. 1: Japanese Laid-Open Patent Publication No. 2009-202406

SUMMARY OF INVENTION

Technical Problem

Silicon carbide is a semiconductor material which has higher hardness, and can be machined less easily, than silicon. For that reason, if a single-crystal silicon carbide wafer should be made in the same way as a single-crystal silicon wafer, it would take a lot more time to make a single-crystal silicon carbide wafer than a single-crystal silicon wafer. Particularly when a given ingot of single-crystal silicon carbide has a large diameter to make a wafer of a huge size, it will take a very long time to get a single-crystal silicon carbide wafer.

The same problem would arise when a wafer of any other high-hardness semiconductor material such as gallium nitride or a wafer of high-hardness sapphire for use to make a gallium nitride semiconductor layer should be made.

The present inventors perfected our invention to overcome these problems by providing a method of making a wafer of a high-hardness material efficiently.

Solution to Problem

A method of cutting a high-hardness material with a multi-wire saw according to the present invention includes the steps of: (A) providing at least one ingot which includes a body portion with two ends and a low-quality crystal portion that is located at only one of the two ends of the body portion; (B) fixing the at least one ingot onto a fixing base; and (C) slicing the at least one ingot by moving the ingot with respect to a saw wire so that the saw wire does not contact with the low-quality crystal portion of the at least one ingot but does contact with its body portion.

The multi-wire saw may have a cutting web which is formed by winding the saw wire over at least two rollers a number of times and which includes a plurality of cutting parts that are strung parallel to each other at regular intervals between the at least two rollers. In the step (C), the cutting web of the saw wire may not contact with the low-quality crystal portion of the at least one ingot but may contact with the body portion.

The step (A) may include providing first and second ingots. The step (B) may include fixing the first and second ingots onto the fixing base so that their ends lacking the low-quality crystal portion face each other. And in the step (C), the cutting web of the saw wire may not contact with the low-quality crystal portion of any of the first and second ingots but may contact with their body portion.

The step (B) may include arranging the second ingot with respect to the first ingot so that the distance from the boundary between the body and low-quality crystal portions of the first ingot to the boundary between the body and low-quality crystal portions of the second ingot becomes equal to or longer than the interval between two cutting parts that are located at two ends of the cutting web of the multi-wire saw.

The saw wire may include a plurality of cutting parts which are strung parallel to each other at regular intervals between the at least two rollers and may have an additional cutting web which is spaced apart from the cutting web with a predetermined gap left between them. The step (A) may include providing first and second ingots. The step (B) may include fixing the first and second ingots onto the fixing base so that the end of the first ingot lacking the low-quality crystal portion faces the low-quality crystal portion of the second ingot. And in the step (C), the cutting web and additional cutting web of the saw wire may not contact with the low-quality crystal portion of any of the first and second ingots but may contact with their body portion.

The step (B) may include arranging the second ingot with respect to the first ingot so that the distance from the end of the first ingot lacking the low-quality crystal portion to the boundary between the low-quality crystal and body portions of the second ingot agrees with the predetermined gap of the saw wire.

The predetermined gap of the saw wire may be determined so as to agree with the distance from the end of the first ingot lacking the low-quality crystal portion to the boundary between the low-quality crystal and body portions of the second ingot.

Each of the at least two rollers may have a plurality of grooves to receive the saw wire in the cutting web. The method may further include the step of measuring respective variations d1 and d2 in the depth of first and second grooves of the at least two rollers from their initial values, and if d2 is three times or more as large as d1, unwinding the saw wire from the second groove to form a new cutting web. The first groove is located in the vicinity of the center of the cutting web in the axial direction of the two rollers. The second groove receives a cutting part of the saw wire that is located closest to the low-quality crystal portion of the at least one ingot.

The method may further include the step of measuring respective variations d1, d2 and d2' in the depth of first, second and third grooves of the at least two rollers from their initial values, and if at least one of d2 and d2' is three times or more as large as d1, unwinding the saw wire from its associated groove to form a new cutting web. The first groove is located in the vicinity of the center of the cutting web in the axial direction of the two rollers. The second groove receives a cutting part of the saw wire that is located closest to the first ingot's low-quality crystal portion in the cutting web of the saw wire. The third groove receives a cutting part of the saw wire that is located closest to the second ingot's low-quality crystal portion in the cutting web of the saw wire.

Each of the at least two rollers may have a plurality of grooves to receive the saw wire in the cutting web and in the additional cutting web. The method may further include the step of measuring respective variations d1, d2 and d2' in the depth of first, second and third grooves of the at least two rollers from their initial values, and if at least one of d2 and d2' is three times or more as large as d1, unwinding the saw wire from its associated groove to form at least one new cutting web. The first groove is located in the vicinity of the center of the cutting web in the axial direction of the two rollers. The second groove receives a cutting part of the saw wire that is located closest to the first ingot's low-quality crystal portion in the cutting web of the saw wire. The third groove receives a cutting part of the saw wire that is located closest to the second ingot's low-quality crystal portion in the additional cutting web of the saw wire.

The method may include adjusting the rotational runout of the at least two rollers to 50 μm or less.

Advantageous Effects of Invention

According to the cutting method of the present invention, a given ingot can be sliced with a low-quality crystal portion left at one end of the ingot. For that reason, compared to a situation where the low-quality crystal portion needs to be removed separately, the time it takes to make a single-crystal silicon carbide wafer can be shortened.

DESCRIPTION OF EMBODIMENTS

Figure 1:
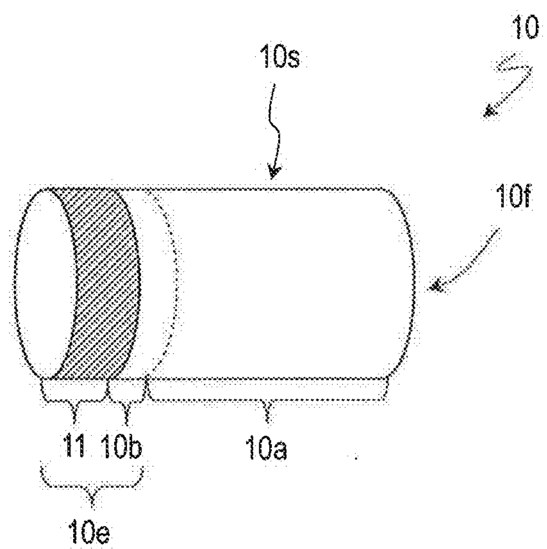
FIG. 1 (*a*) is a perspective view illustrating an ingot of single-crystal silicon carbide for use in a first embodiment and (b) is a perspective view illustrating single-crystal silicon carbide obtained by crystal-growing process.
Figure 1:
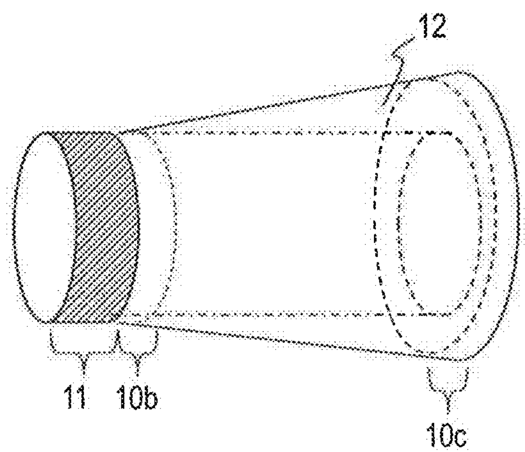

Since single-crystal silicon carbide has higher hardness than single-crystal silicon, it takes a longer time to cut single-crystal silicon carbide than silicon. In addition, the roller's groove which determines the position of the outermost saw wire is easily affected by a variation in tension and gets worn easily, which is also a problem. The present inventors looked for a method for shortening as much as possible the time it would take to make wafers out of an ingot of single-crystal silicon carbide by reducing the number of times of cutting in a situation where single-crystal silicon carbide with high hardness should be sliced into single-crystal silicon carbide wafers by performing the same process as in making silicon wafers.

In the conventional semiconductor wafer manufacturing process, first of all, a growing end portion and a low-quality crystal portion with low crystal quality which are located at two ends of a single-crystal semiconductor ingot are removed by cutting or grinding. The side surface of the ingot is cut into an intended shape. And then the shaped ingot is pushed against the center of the multi-wire saw, thereby slicing the ingot. According to this method, however, it will take an enormous amount of time to cut or grind the growing end portion and the low-quality crystal portion because single-crystal silicon carbide is a difficult-to-machine material, and therefore, the productivity of wafers will drop significantly.

Thus, to avoid such a problem, the entire ingot could be cut altogether by the multi-wire saw without removing those growing end and low-quality crystal portions and without using the outermost saw wire. In that case, however, if the low-quality crystal portion were cut as it is, then the resultant wafers could have cracks or extra tension could be applied to the wire and cause the wire to snap easily, because there are a lot of amorphous parts, poly-types and dislocations in that low-quality crystal portion. These are also problems.

The present inventors discovered that if the ingot was sliced with only the growing end portion cut off and with the remaining low-quality crystal portion sticking out of the cutting web of the saw wire, the time it would take to make the wafers could be shortened to two-thirds to a half of the conventional process without causing such problems. Now embodiments of a method of cutting a high-hardness material with a multi-wire saw according to the present invention will be described in detail.

Embodiment 1

A first embodiment of a method of cutting a high-hardness material with a multi-wire saw according to the present invention will be described.

A method according to this embodiment includes the steps of (A) providing an ingot of a high-hardness material, (B) fixing the ingot on a fixing base, and (C) slicing the ingot. Examples of the high-hardness materials include silicon carbide, sapphire, gallium nitride, aluminum nitride, diamond, boron nitride, zinc oxide, gallium oxide and titanium dioxide. The high-hardness material may be either a single crystalline material or a polycrystalline material. In the following description, the high-hardness material is supposed to be single-crystal silicon carbide as an example.

First of all, the step of providing an ingot including single-crystal silicon carbide will be described. FIG. 1(*a*) is a schematic perspective view illustrating an ingot for use in this embodiment. The ingot 10 includes a body portion 10*a* and a low-quality crystal portion 10*e* which is located at only one of the two ends of the body portion 10*a*. At least the body portion 10*a* is made of single-crystal silicon carbide. The low-quality crystal portion 10*e* includes single-crystal silicon carbide but may also include amorphous silicon carbide and poly-types. The ingot 10 may be obtained by machining silicon carbide which has grown epitaxially on a seed crystal 11 of silicon carbide as shown in FIG. 1(*b*). The method of growing silicon carbide 12 is not particularly limited. But silicon carbide 12 may be grown by modified Rayleigh method or any of various other single crystal growing methods.

As shown in FIG. 1(*b*), the grown silicon carbide 12 includes a low-quality crystal region 10*b* with low crystal quality in the vicinity of the interface between the silicon carbide 12 and the seed crystal 11. The grown silicon carbide 12 does not have a perfectly circular cylindrical shape and the growing end portion 10*c* is not flat, either. That is why first of all, the growing end portion 10*c* is cut off with a cutting machine such as a coarse machining band saw, for example, and then the remaining silicon carbide 12 is subjected to a planarization process with a grinder, for example. As a result, the other end of the silicon carbide 12 that is located opposite from the low-quality crystal region 10*b* gets planarized. After that, the crystallographic orientation of the end face is determined with a crystal orientation measuring system, for example. In accordance with the crystal orientation thus determined, the principal surface is machined so that the principal surface of the wafers to be sliced off will have the predetermined crystal orientation and the cutting direction is determined. Next, the outer cylindrical side surface of the silicon carbide 12 is ground with a coarse machining grinding machine so that a circular cylindrical ingot 10 with a side surface that intersects with the cutting direction determined at right angles is obtained as indicated by the one-dot chain in FIG. 1(*b*). The diameter of the ingot 10 depends on the thickness of the silicon carbide 12 grown. According to the modified Rayleigh method, the silicon carbide 12 can be grown to have a diameter which is large enough to slice off 4 inch wafers, for example, from the ingot.

In this manner, a circular cylindrical ingot 10 having an end face 10*f* with the predetermined crystal orientation and a side surface 10*s* which intersects at right angles with the end face 10*f* is obtained as shown in FIG. 1(*a*). As shown in FIG. 1(*a*), the ingot 10 includes the body portion 10*a* with high crystal quality and only a small number of defects, the low-quality crystal region 10*b*, and the seed crystal 11. In the following description, the seed crystal 11 and the low-quality crystal region 10*b* will be hereinafter collectively referred to as a "low-quality crystal portion 10*e*". As shown in FIG. 1(*a*), the low-quality crystal portion 10*e* is located on only one of the two ends of the circular cylindrical body portion 10*a*.

Figure 2:
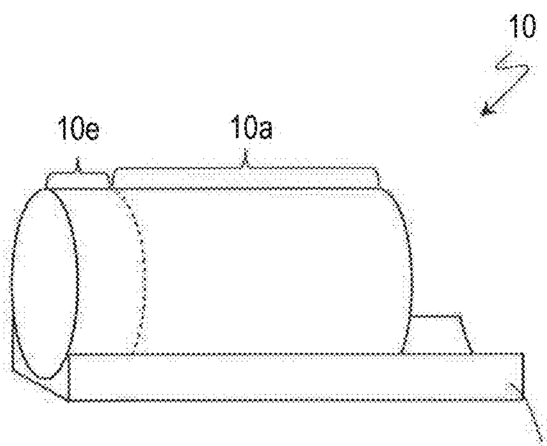
FIG. 2 A perspective view illustrating a state where the ingot shown in FIG. 1 has been fixed onto a fixing base.

Next, the step of fixing the ingot 10 onto a fixing base will be described. As shown in FIG. 2, the side surface of the ingot 10 is fixed onto a fixing base 14 with a recess, of which the shape corresponds to that of the side surface. The ingot 10 may be fixed with an epoxy adhesive for slicing a semiconductor ingot (such as W bond produced by Nikka Seiko Co., Ltd.), for example. When the ingot 10 has been cut completely, the fixing base 14 may also be cut partially. Nevertheless, the fixing base 14 is suitably thick enough to leave some uncut portions even then so as to prevent the wafers sliced off from falling into pieces.

Next, the step of slicing the ingot 10 will be described. The ingot 10 may be sliced with a general multi-wire saw for use to manufacture semiconductor wafers. Cutting methods with a multi-wire saw are roughly classifiable into a loose abrasive method and a fixed abrasive method. According to the loose abrasive method, a cutting process is carried out with slurry in which diamond abrasive particles are dispersed in an aqueous or oil based solution supplied onto a saw wire such as a piano wire. On the other hand, according to the fixed abrasive method, a cutting process is carried out with cutting fluid supplied onto a saw wire in which diamond abrasive particles are fixed on a wire such as a piano wire by plating, for example. In this embodiment, any of these two methods may be adopted.

If a three-inch ingot 10 is sliced by the method of this embodiment, one of the following two conditions may be adopted, for example:

(Loose Abrasive Method)

Multi-wire saw: multi-wire saw MWS-34 produced by Takatori Corporation;

Piano wire: piano wire with Φ of 0.16 produced by Japan Fine Steel Co., Ltd.;

Slurry's base solution: PS-L-40 produced by Palace Chemical Co., Ltd.; and

Diamond abrasive particles: their particle size and concentration are determined by the cut face roughness and cutting speed required (Fixed Abrasive Method)

Multi-wire saw: multi-wire saw MWS-34 produced by Takatori Corporation;

Wire: diamond-electrodeposited wire with Φ of 0.25 produced by Allied Material (A. L. M. T. Corp.); and Cutting fluid: DKW-2 produced by Allied Material (A. L. M. T. Corp.)

Figure 3:
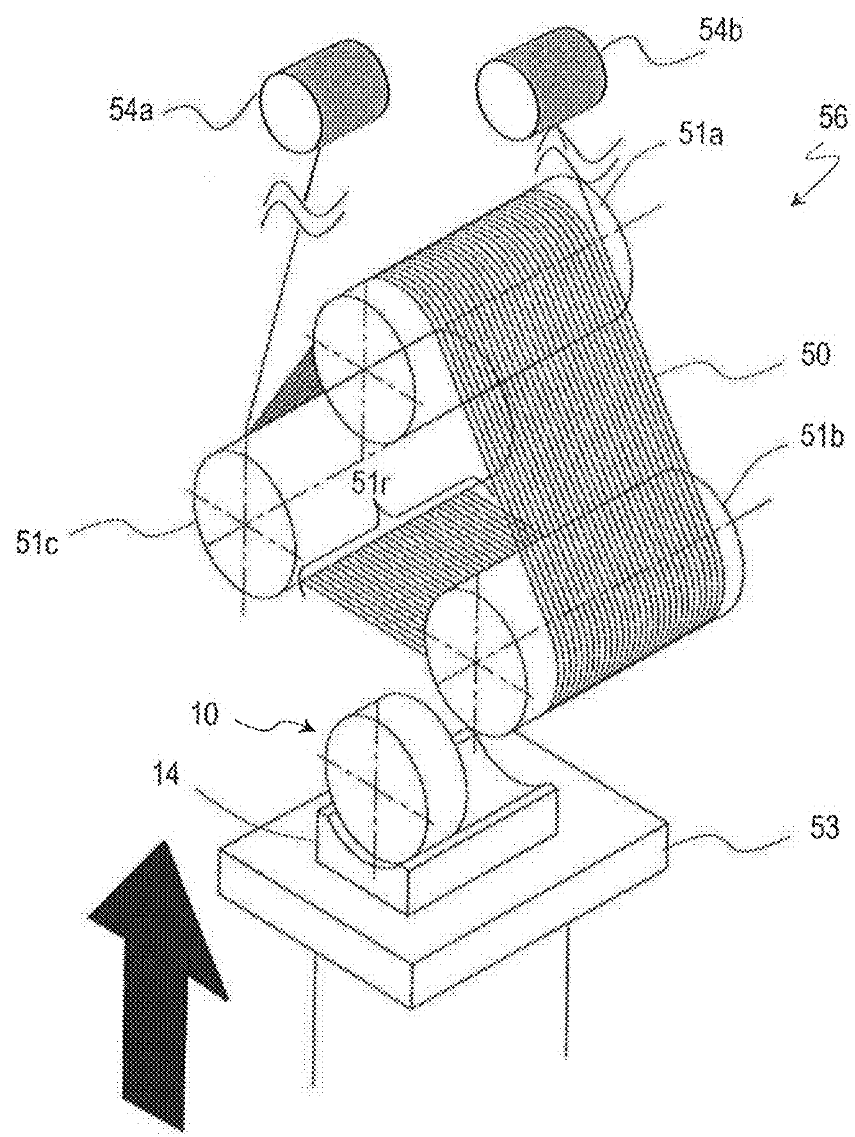
FIG. 3 A perspective view illustrating a state where the ingot shown in FIG. 2 has been loaded into a multi-wire saw for use in the first embodiment.

Also, in this embodiment, a multi-wire saw with any of various configurations may be used. FIG. 3 schematically illustrates a multi-wire saw 56 with three rollers. Specifically, the multi-wire saw 56 includes rollers 51*a*, 51*b* and 51*c* and a saw wire 50 which is wound over the rollers 51*a*, 51*b* and 51*c* a number of times.

Both ends of the saw wire 50 may be wound around supply/take-up spools 54*a* and 54*b*. Although these supply/take-up spools 54 and 54*b* are arranged close to the roller 51*a* in the example illustrated in FIG. 3 for the sake of simplicity, the supply/take-up spools 54*a* and 54*b* may also be arranged distant from the rollers 51*a*, 51*b* and 51*c*. The saw wire 50 has a plurality of cutting parts which are arranged parallel to each other at regular intervals between the rollers 51*b* and 51*c*, thus forming a multi-wire saw there.

At the time of cut-grinding process, the supply/take-up spools 54*a* and 54*b* and the rollers 51*a*, 51*b* and 51*c* rotate in the same direction to have one of the supply/take-up spools 54*a* and 54*b* collect the saw wire 50 used. When the saw wire 50 used is collected to a predetermined length by one of the supply/take-up spools, the direction of rotation of the supply/take-up spools 54*a* and 54*b* and the rollers 51*a*, 51*b*, and 51*c* is reversed. As a result, the saw wire 50 starts to move in the reverse direction and eventually gets collected by the other of the supply/take-up spools 54*a* and 54*b*. By getting this done repeatedly, the saw wire 50 reciprocates (i.e., moves back and forth).

By bringing the ingot 10 into contact with the saw wire 50 in a first cutting web 51*r* which is formed by the saw wire 50 between the rollers 51*b* and 51*c* with a slurry or a cutting fluid supplied onto the first cutting web 51*r*, the ingot 10 gets sliced at multiple points at the same time into a huge number of wafers. As shown in FIG. 3, the multi-wire saw 56 of this type generally slices the ingot 10 supported on the fixing base 14 by getting the ingot 10 pushed upward (toward the first cutting web 51*r*) by a stage 53.

Figure 4:
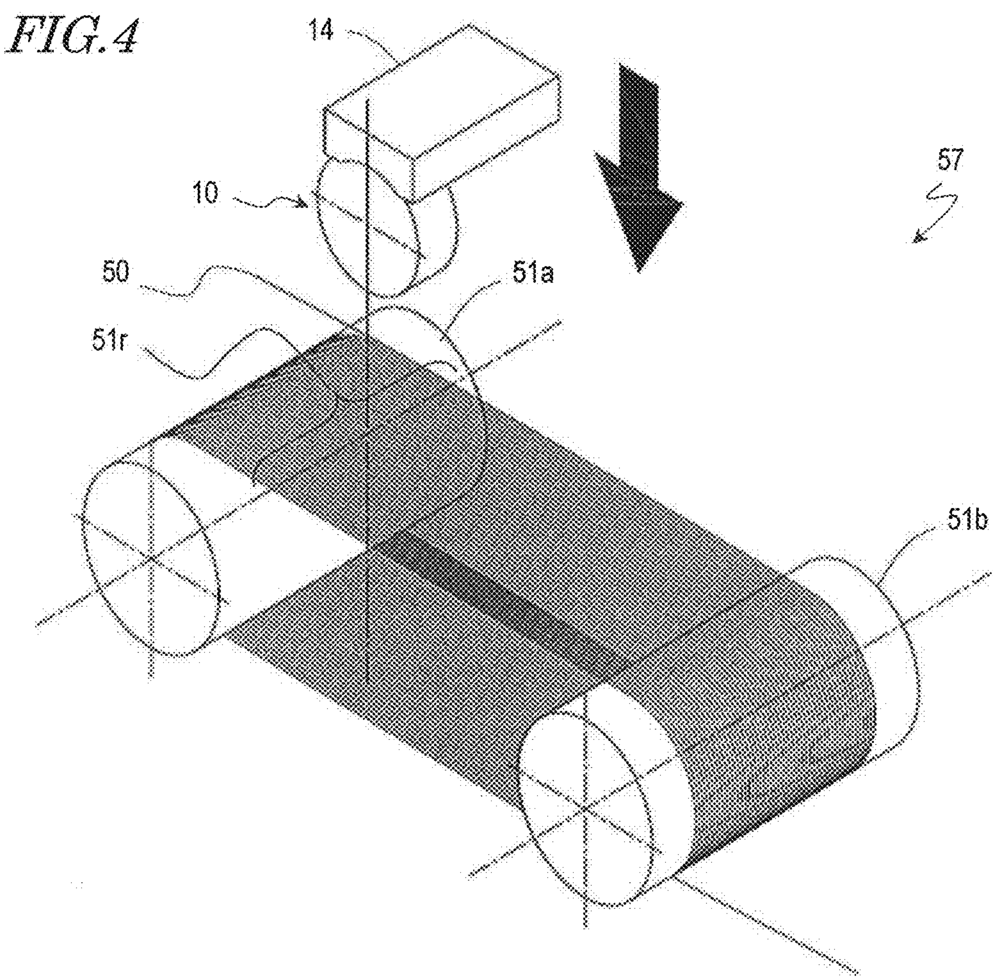
FIG. 4 A perspective view illustrating a state where the ingot shown in FIG. 2 has been loaded into another multi-wire saw for use in the first embodiment.

FIG. 4 schematically illustrates a multi-wire saw 57 with two rollers. This multi-wire saw 57 includes rollers 51*a* and 51*b* and a saw wire 50 which is wound a number of times over the rollers 51*a* and 51*b*. The saw wire 50 forms a multi-wire saw, where multiple cutting parts are arranged parallel to each other at regular intervals, between the rollers 51*a* and 51*b*. That is why the ingot 10 gets sliced at multiple points simultaneously into a huge number of wafers in that first cutting web 51*r* formed by the saw wire 50 between the rollers 51*a* and 51*b*. As shown in FIG. 4, the multi-wire saw 57 of this type generally slices the ingot 10 supported on the fixing base 14 by pushing the ingot 10 downward against the first cutting web 51*r*, for example.

Any saw wire which can be used appropriately to cut single-crystal silicon carbide may be used as the saw wire 50. Also, the pitch between the cutting parts of the saw wire 50 in the first cutting web 51*r* is adjusted according to the specification (thickness, in particular) of wafers to be obtained. This multi-wire saw is operated under an appropriate condition for cutting single-crystal silicon carbide.

The multi-wire saw does not have to be such a type with a saw wire that moves bidirectionially. Alternatively, a multi-wire saw of the type with a saw wire that moves in one direction between rollers, a multi-wire saw of the type with rollers that swing either up and down or in arc, or a multi-wire saw of the type in which each roller moves back and forth and to the right and to the left may also be used.

Next, the relative arrangement of the ingot 10 and the saw wire will be described. As already described with reference to FIG. 1(*a*), the ingot 10 prepared has the low-quality crystal portion 10*e* at one of the two ends thereof. A lot of dislocations and other defects have been generated in the low-quality crystal region 10*b* of the low-quality crystal portion 10*e*. That is why if the low-quality crystal region 10*b* is cut with a saw wire, cracks will be caused in the low-quality crystal region 10*b* and may propagate and reach the body portion 10*a*. Or extra tension may be applied to the saw wire 50 to possibly cause the wire 50 to snap. In addition, by cutting the low-quality crystal region 10*b*, the chips of the low-quality crystal region 10*b* will get mixed with the slurry and deteriorate the purity of the slurry.

Figure 5:
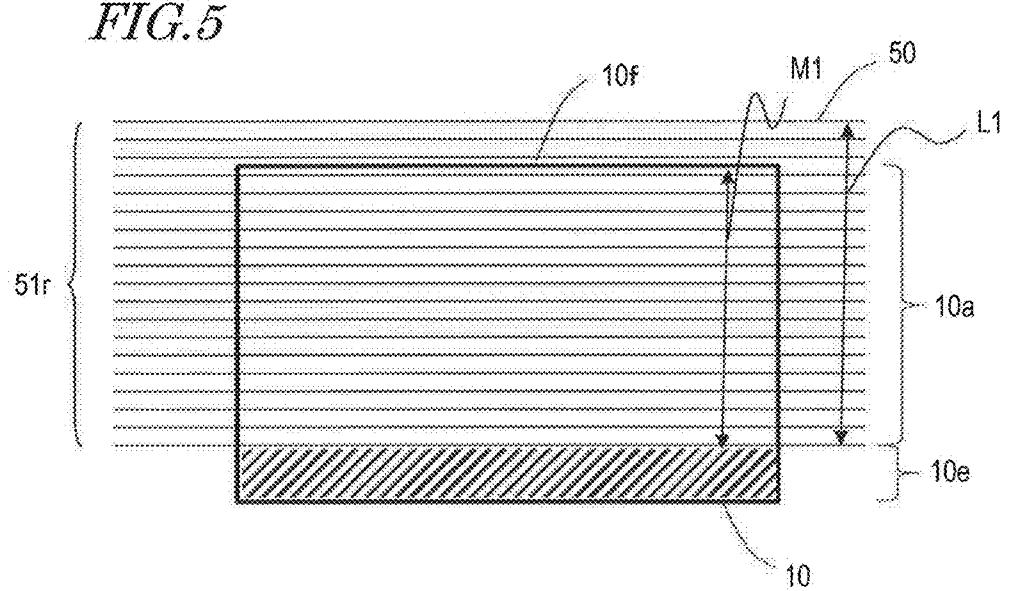
FIG. 5 Illustrates the relative arrangement of a first cutting web of a saw wire with respect to the ingot in the first embodiment.

For that reason, the ingot 10 is sliced by moving the ingot with respect to the saw wire so that the saw wire does not contact with the low-quality crystal portion 10*e* of the ingot 10 but contacts with only the body portion 10*a* thereof. Specifically, as shown in FIG. 5, the ingot 10 is arranged so that only the body portion 10*a* of the ingot 10 contacts with the first cutting web 51*r* formed by the saw wire 50 and that the low-quality crystal portion 10*e* is located outside of the first cutting web 51*r*. In this embodiment, the length L1 of the first cutting web 51*r* as measured along the axis of the rollers is greater than the length M1 of the body portion 10*a* of the ingot 10 (i.e., the distance from the boundary between the low-quality crystal portion 10*e* and the body portion 10*a* to the end face 10*f*). However, these lengths L1 and M1 may be equal to each other (i.e., L1=M1 may be satisfied) or the length M1 may be greater than the length L1. If the saw wire does not contact with the low-quality crystal portion 10*e* of the ingot 10 but does contact with only the body portion 10*a* thereof, single-crystal silicon carbide wafers can be manufactured in a shorter time than in a situation where the low-quality crystal portion 10*e* should be removed separately.

Figure 6A:
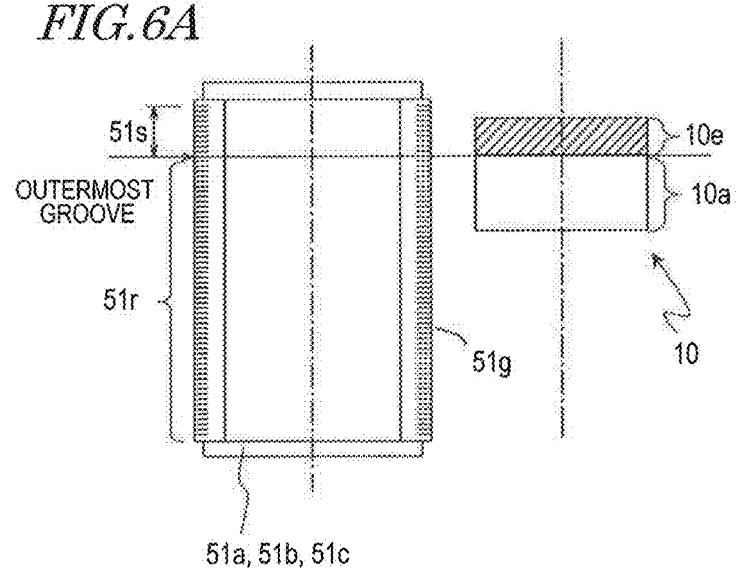
FIG. 6A Shows exemplary specific relative positions of a roller, grooves to receive the saw wire, the first cutting web and the ingot in a multi-wire saw for use in the first embodiment.
Figure 6B:
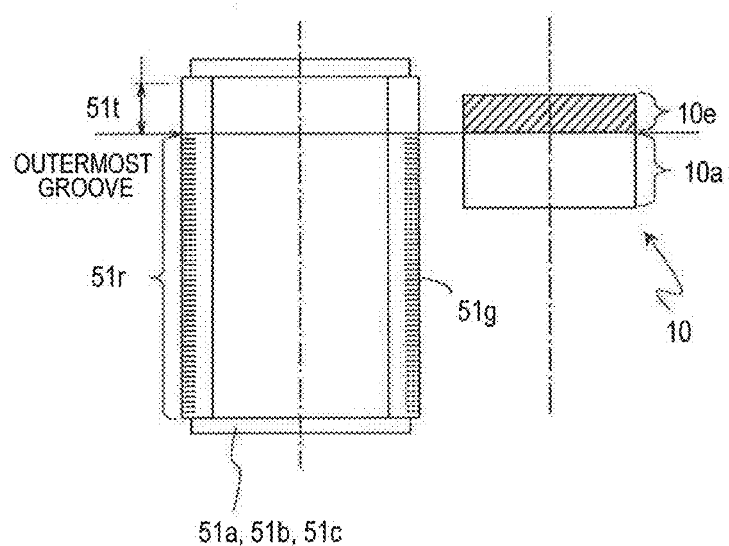
FIG. 6B Shows other exemplary specific relative positions of a roller, grooves to receive the saw wire, the first cutting web and the ingot in a multi-wire saw for use in the first embodiment.

It should be noted that depending on the configuration of the multi-wire saw machine, the ingot 10 could not be held so that the low-quality crystal portion 10*e* is located outside of the first cutting web 51*r* as shown in FIG. 5. In that case, the multi-wire saw machine may be configured so that the saw wire 50 is not wound around some (in the region 51*s*) of the multiple grooves that have been cut on each of the rollers 51*a*, 51*b* and 51*c* to receive the saw wire 50 as shown in FIG. 6A. Then, the ingot 10 may be arranged so that the low-quality crystal portion 10*e* is located in the region 51*s* outside of the first cutting web 51*r*. Alternatively, rollers 51*a*, 51*b* and 51*c* having no grooves 51*g* in the region 51*t* may be used and the saw wire 50 may be wound around every groove 51*g* as shown in FIG. 6B. Even when rollers 51*a*, 51*b* and 51*c* with such a configuration are used, the ingot 10 can also be arranged so that the low-quality crystal portion 10*e* is located in the region 51*t* outside of the first cutting web 51*r*.

Subsequently, as shown in FIG. 3 or 4, the ingot 10 supported on the fixing base 14 is moved in the direction indicated by the arrow, thereby making the first cutting web 51*r* of the saw wire cut the body portion 10*a* of the ingot 10. As a result, a number of single-crystal silicon carbide wafers are sliced off simultaneously. At this time, the low-quality crystal portion 10*e* is out of contact with the first cutting web 51*r* of the saw wire. Consequently, crack-free single-crystal silicon carbide wafers can be obtained without causing the problems described above. In addition, since the saw wire 50 is much less likely to snap, the chances of causing the trouble of having to stop the machine due to the saw wire 50 snapping and rewinding the saw wire 50 can be reduced as well. Further, the deterioration of the slurry can also be minimized. Consequently, the yield can be increased, the average process time that it takes to manufacture single-crystal silicon carbide wafers can be shortened, and eventually, the manufacturing cost can be cut down.

Generally speaking, however, both end portions of the wire web formed by the saw wire 50 of a multi-wire saw are likely to be subject to higher tension than the rest of the wire web, because those end portions are located at the outermost positions of the first cutting web 51*r*. That is why according to a conventional method of cutting an ingot using a multi-wire saw, the ingot is arranged with respect to the saw wire 50 so that the ingot is not cut by such end portions of the wire web formed by the saw wire 50 at the outermost positions of the first cutting web 51*r*. That is to say, the ingot is arranged around the center of the first cutting web 51*r* so that both end portions of the wire web located at the outermost positions of the first cutting web 51*r* are out of contact with the ingot. For that reason, the low-quality crystal portion should be removed in advance.

Figure 7A:
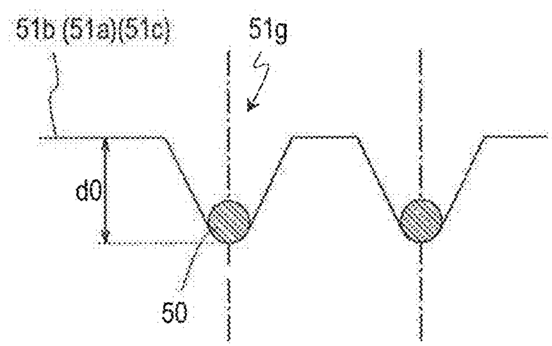
FIG. 7A A cross-sectional view illustrating a saw wire wound over a roller of a multi-wire saw.

FIG. 7A schematically illustrates an end face of the saw wire 50 wound around the roller 51*b*, for example. A number of grooves 51*g* to guide the saw wire 50 have been cut on the roller 51*b* and the saw wire 50 is located inside the grooves 51*g*. As shown in FIG. 7A, before the ingot 10 is cut, every groove 51*g* of the roller 51*b* has the same depth d0.

Figure 7B:
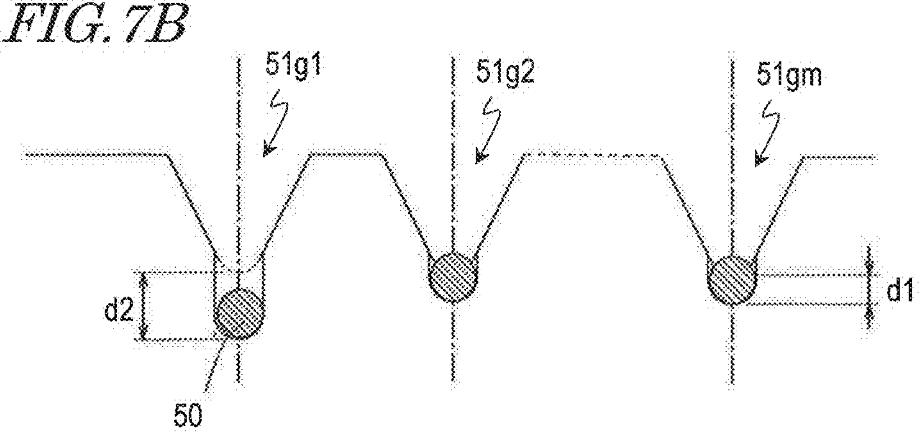
FIG. 7B A cross-sectional view illustrating a saw wire wound over a roller of a multi-wire saw and showing that the outermost groove of the first cutting web has become deeper.

By pushing the ingot 10 against the saw wire 50 with the rollers 51*b*, etc. rotated, the ingot 10 gets sliced. Since the saw wire 50 receives force from the ingot 10 in the meantime, the grooves 51*g* receiving the saw wire 50 will soon get worn and come to have increased depth. Furthermore, if the ingot 10 is sliced by the method of this embodiment, higher tension is applied to those end portions of the wire web formed by the saw wire 50 at the outermost positions of the first cutting web 51*r* (including a portion located closest to the low-quality crystal portion 10*e*) than any other portion of the wire web. FIG. 7B illustrates schematically how the outermost groove 51*g*1 of the roller 51*b* has become deeper than any other groove 51*gm* for that reason. As the ingot 10 is going to be cut deeper and deeper, the outermost groove 51*g*1 of the roller 51*b* becomes deeper than the grooves 51*m* in a stationary portion. In this description, the "stationary portion" refers herein to a portion of the wire web formed by the saw wire 50 which is not affected by the tension to be applied to those end portions of the wire web. Specifically, the stationary portion refers herein to the grooves around the center of the first cutting web 51*r*. If the variation in depth from the initial value due to the wear of the grooves 51*m* in the stationary portion is d1 and the variation in depth from the initial value due to the wear of the groove 51*g*1 at the outermost position is d2, then d2>d1 is satisfied.

If some of the roller grooves that receive the saw wire became deeper than the other grooves in this manner, then tension would no longer be uniformly applied to the saw wire and the ingot 10 could not be cut uniformly anymore. For that reason, according to this embodiment, such a variation in the depth of the roller grooves 51*g* due to their wear is measured at regular intervals, and if the variation d2 in the depth of the outermost groove 51*g*1 from its initial value is greater to more than a predetermined degree than the variation d1 in the depth of the grooves 51*gm* in the stationary portion from their initial value, then the saw wire 50 is unwound from that groove 51*g*1 to stop slicing the ingot 10 there. And the cutting web is redefined so that the saw wire 50 wound around the second outermost groove (i.e., the groove 51*g*2) is located at the outermost position of the cutting web and the ingot 10 starts to be cut again. In this case, the predetermined interval may be either a constant time period such as 20 hours or a period determined by the number of times of cutting of the ingot.

The present inventors discovered via exhaustive experiments that when the variation d2 in the depth of the outermost groove 51*g*1 from its initial value due to its wear came to satisfy d2≥3×d1 with respect to the variation d1 in the depth of the grooves 51*gm* in the stationary portion from their initial value due to their wear (i.e., if d2 became 300% or more of d1), the position of the saw wire 50 should be changed and that when d2 came to satisfy d2≥2×d1, the position of the saw wire 50 had to be changed. If the second outermost groove 51*g*2 has become the outermost groove to receive the saw wire 50 by changing the position of the saw wire 50, then d2 and d1 are measured as initial depth values of the currently outermost groove 51*g*2 and the grooves 51*gm* in the stationary portion and the currently outermost groove 51*g*2 is managed under the condition described above. As a result, every portion of the saw wire can now be in contact with the ingot 10 under proper tension, and the ingot 10 can be cut efficiently.

Also, to prevent the saw wire 50 from snapping under excessively high tension and prevent the single-crystal silicon carbide wafers sliced off from the ingot 10 from having significantly varying thicknesses, the rollers 51*a*, 51*b* and 51*c* suitably have a rotational runout of 50 μm or less. The rotational runout may be controlled in the following manner. Specifically, the rollers 51*a*, 51*b* and 51*c* are attached to the multi-wire saw machine and their rotational runout is measured with the rollers 51*a*, 51*b* and 51*c* rotated slowly. If the runout of the rollers 51*a*, 51*b* and 51*c* rotating turns out to be greater than 50 μm, then the rollers 51*a*, 51*b* and 51*c* may be stopped, once removed and then attached to the machine again at different positions. After that, their rotational runout is measured again. This procedure will be performed over and over again until the runout value becomes equal to or smaller than 50 μm. This condition is also applicable to the multi-wire saw shown in FIG. 4, for example.

By performing this series of process steps, single-crystal silicon carbide wafers can be sliced off from the ingot 10.

According to the method of this embodiment, the ingot 10 can be sliced with the low-quality crystal portion 10*e* left at one end of the ingot 10. For that reason, compared to a situation where the low-quality crystal portion 10*e* needs to be removed separately, the time it takes to make single-crystal silicon carbide wafers can be shortened. Since silicon carbide has much higher hardness than silicon as described above, it takes a lot more time to cut an ingot of silicon carbide at one point than cutting silicon at one point. Particularly if the ingot has a large diameter, it takes a far longer time to get the cutting process done. For that reason, according to the method of this embodiment, the manufacturing process time can be shortened significantly particularly when single-crystal silicon carbide wafers with a large diameter need to be manufactured.

In addition, by managing the roller groove to receive the outermost portion of the saw wire as described above, the saw wire can be prevented from snapping and the operating rate of the multi-wire saw can be increased. As a result, single-crystal silicon carbide wafers with a large diameter can be manufactured with increased productivity and at a reduced manufacturing cost.

Further, by unwinding the saw wire from the worn groove, a cutting part with poor positioning accuracy can be removed from the saw wire. As a result, the saw wire can ensure high machining accuracy and non-warped wafers with a low degree of profile irregularity can be manufactured.

Embodiment 2

A second embodiment of a method of cutting a single-crystal material with a multi-wire saw according to the present invention will be described. According to this embodiment, two or more ingots 10 can be sliced simultaneously with a multi-wire saw.

First of all, two ingots 10 and 10' (which will be hereinafter referred to as "first and second ingots") are prepared in the same way as in the first embodiment.

Figure 8:
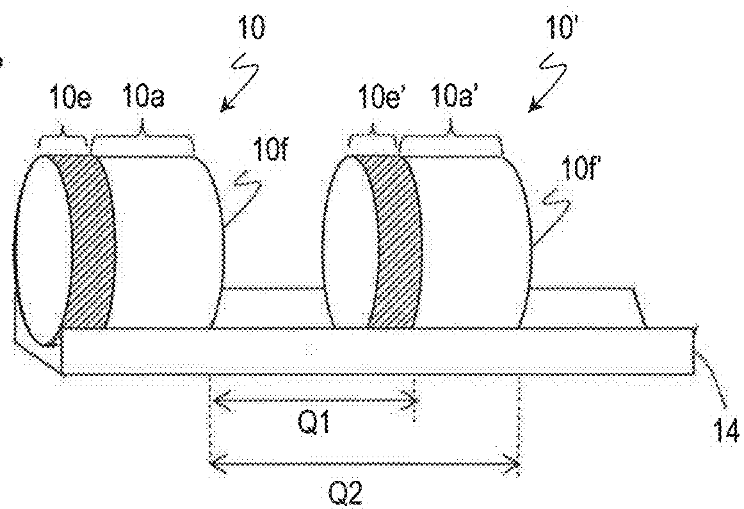
FIG. 8 A perspective view illustrating a state where two ingots have been fixed onto a fixing base in a second embodiment.

Next, these two ingots 10 and 10' are fixed onto the fixing base 14. In this case, the ingots 10 and 10' are arranged so that the end face 10*f* of the ingot 10 on which its low-quality crystal portion 10*e* is not located faces the low-quality crystal portion 10*e'* of the other ingot 10'. Also, as shown in FIG. 8, the distance from the end face 10*f* of the ingot 10 on which its low-quality crystal portion 10*e* is not located to the boundary between the low-quality crystal portion 10*e'* and body portion 10*a'* of the ingot 10' is set to be Q1. The distance from the end face 10*f* of the ingot 10 to the end face 10*f'* of the ingot 10' is Q2. It should be noted that the lengths of the respective low-quality crystal portions 10*e* and 10*e'* of the ingots 10 and 10' are approximately equal to each other. And the respective lengths of their body portions 10*a* are also approximately equal to each other. As will be described later, the distances Q1 and Q2 are determined by the arrangement of the saw wire 50 in the multi-wire saw. Q1 substantially agrees with P1 to be described later. Meanwhile, Q2 substantially agrees with L1+P1.

Figure 9:
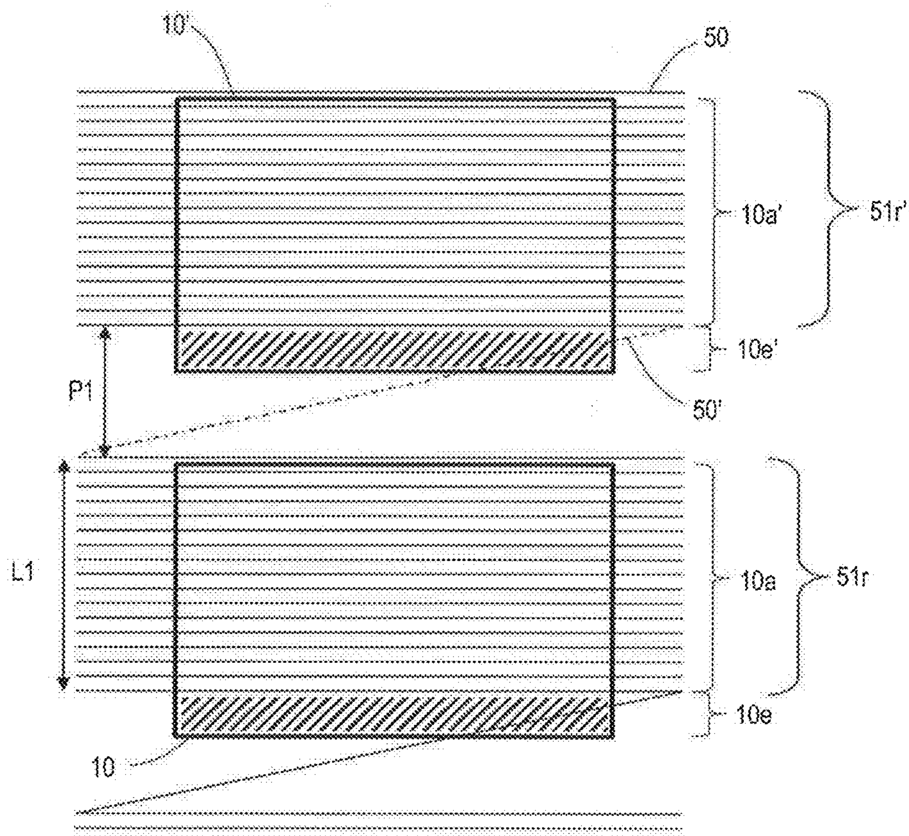
FIG. 9 Shows a relative arrangement of first and second cutting webs of a saw wire in the second embodiment.

Next, the step of slicing the ingots 10 and 10' will be described. As shown in FIG. 9, the multi-wire saw has first and second cutting webs 51*r* and 51*r'*, each of which is comprised of a plurality of cutting parts that are arranged at regular intervals between the rollers. The gap between the first and second cutting webs 51*r* and 51*r'* is P1. As in the first embodiment described above, the length of the first and second cutting webs 51*r* and 51*r'* as measured parallel to the axis of the rollers is L1. The gap P1 is determined in advance by the arrangement of the saw wire 50 that is wound over the rollers of this multi-wire saw machine.

The saw wire 50 is not strung between the first and second cutting webs 51*r* and 51*r'*. As indicated by the one-dot chain in FIG. 9, the saw wire 50' is strung obliquely so as to skip the grooves around which the saw wire 50 would otherwise be wound in the region where the first and second cutting webs 51*r* and 51*r'* are not adjacent to each other as shown in FIG. 10 and as will be described below.

Figure 10:
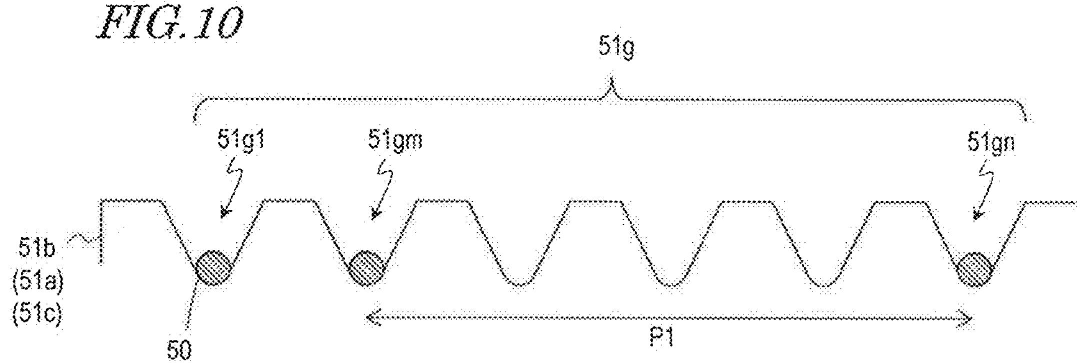
FIG. 10 A cross-sectional view illustrating a saw wire wound over a roller of a multi-wire saw in the second embodiment.

FIG. 10 schematically illustrates a cross section of the saw wire 50 which has two cutting webs and which is wound over the rollers. To leave a gap P1 between the first and second cutting webs 51*r* and 51*r'*, the saw wire is not wound around the grooves 51*g* that are located in the gap P1. Such arrangement of the saw wire may be realized by winding, in the multi-wire saw shown in FIG. 3, for example, the saw wire 50' that is wound around a certain groove 51*gm* of the roller 51*a* around not its corresponding groove 51*gm* of the roller 51*b* but another groove 51*gn* of the roller 51*b* that is located at the distance P1 from that corresponding groove 51*gm*. In that case, the saw wire 50' is strung obliquely with a width corresponding to the gap P1 between the rollers 51*a* and 51*b*. However, since the saw wire strung between the rollers 51*a* and 51*b* has neither the first cutting web 51*r* nor the second cutting web 51*r'*, the ingot is never cut obliquely. Such a technique of stringing the saw wire 50 obliquely is applicable as a "groove skipping" technique to any general multi-wire saw.

By using such a saw wire 50 that is wound over the rollers as shown in FIG. 9 and by moving the fixing base 14 in the same way as in the first embodiment, single-crystal silicon carbide wafers can be manufactured by slicing just the respective body portions 10*a* of the ingots 10 and 10' without cutting their low-quality crystal portions 10*e*. In this case, the depths of the roller grooves to receive the saw wire's cutting parts which are located closest to the low-quality crystal portions 10*e* and 10*e'* of the ingots 10 and 10' are suitably measured and managed based on the variations d2 and d2' in the depth of those grooves from their initial values to see how much those grooves have been worn.

According to this embodiment, a plurality of ingots 10 can be sliced simultaneously, and therefore, single-crystal silicon carbide wafers can be manufactured in an even shorter time.

In the embodiment described above, the ingots 10 and 10' are fixed onto the fixing base 14 in accordance with the gap P1 determined by the arrangement of the saw wire 50 that is wound over the rollers.

Conversely, however, the winding position of the saw wire 50 may be determined in accordance with the arrangement of the ingots 10 and 10'.

Figure 11:
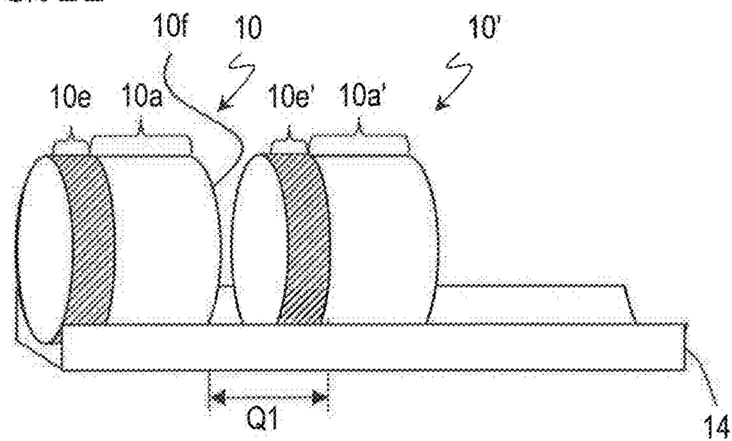
FIG. 11 A perspective view illustrating another state where two ingots have been fixed onto a fixing base in the second embodiment.

First of all, two ingots 10 and 10' (which will be hereinafter referred to as "first and second ingots") are prepared in the same way as in the first embodiment. Next, those two ingots 10 and 10' are fixed onto the fixing base 14 as shown in FIG. 11. In this case, the distance Q1 from the end face 10*f* of the ingot 10 on which the low-quality crystal portion 10*e* is not located to the boundary between the low-quality crystal portion 10*e'* and body portion 10*a'* of the ingot 10' may be set to be any arbitrary value. Nevertheless, Q1 should be longer than the minimum winding pitch of the saw wire in the multi-wire saw (i.e., the pitch between the roller grooves 51*g*). Also, if Q1 were too long, then the tension applied to the saw wire that is strung obliquely between the rollers could be so high that sometimes it could be difficult to perform the cutting process under an appropriate condition. For that reason, Q1 is determined within an appropriate "groove skipping" range that has been set for the multi-wire saw.

Figure 12:
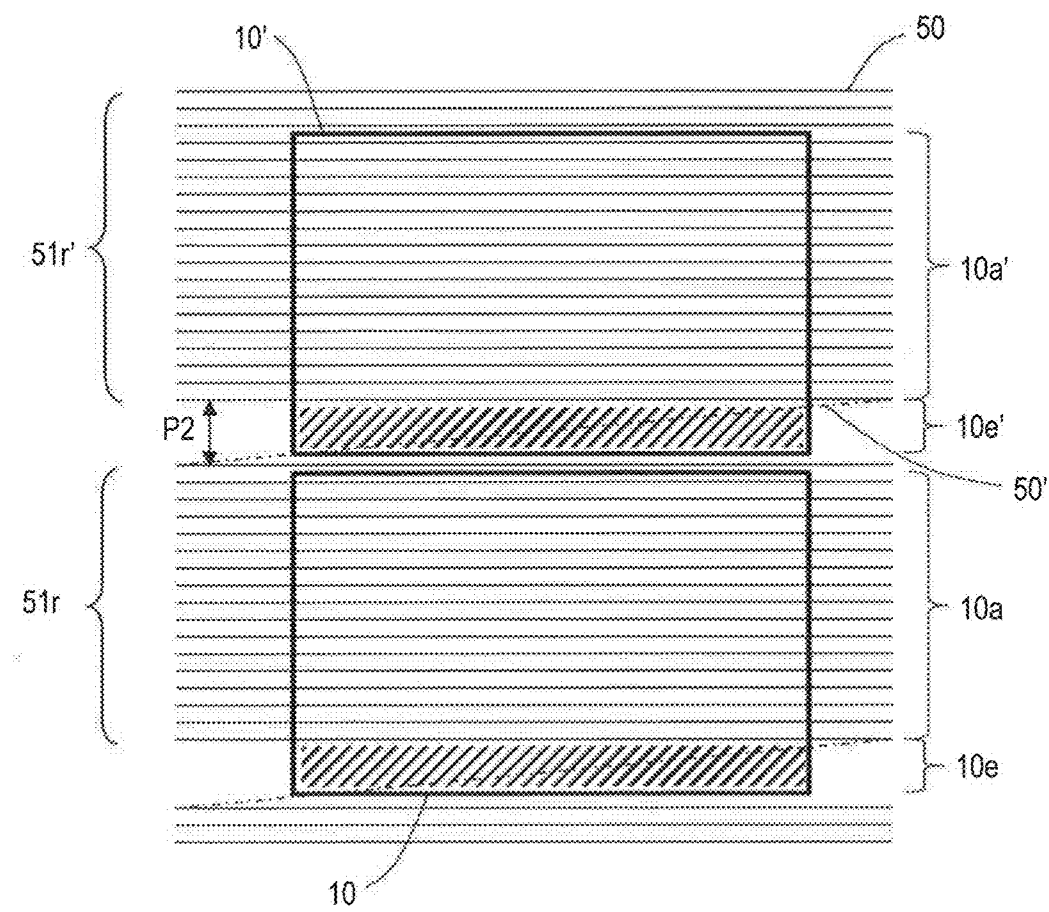
FIG. 12 Shows another relative arrangement of first and second cutting webs of a saw wire in the second embodiment.

Next, the saw wire 50 gets wound over the rollers so that the first and second cutting webs 51*r* and 51*r'* are arranged with a gap P2 corresponding to the distance Q1 between the two ingots 10 and 10' left between them as shown in FIG. 12. As described above, the saw wire may get wound with some grooves skipped in order to leave the gap P2 that is as long as the distance Q1.

Even when such a method is adopted, a plurality of ingots 10 can also be sliced simultaneously, and therefore, single-crystal silicon carbide wafers can also be manufactured in an even shorter time.

Embodiment 3

A third embodiment of a method of cutting a single-crystal material with a multi-wire saw according to the present invention will be described. In this third embodiment, two or more ingots are arranged differently from in the second embodiment.

First of all, two ingots 10 and 10' (which will be hereinafter referred to as "first and second ingots") are prepared in the same way as in the first embodiment.

Figure 13A:
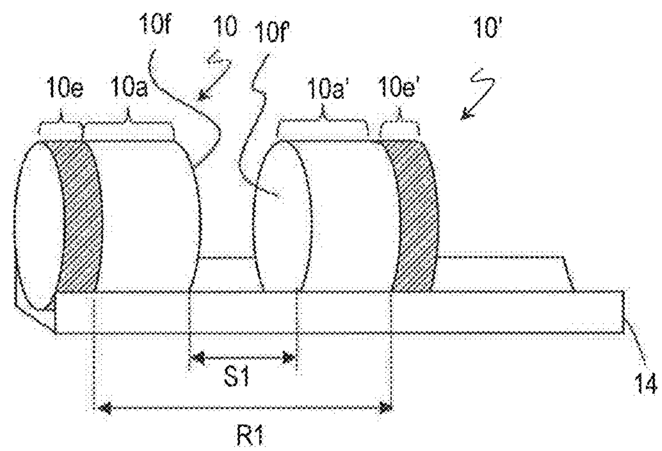
FIG. 13A A perspective view illustrating a state where two ingots have been fixed onto a fixing base in a third embodiment.

Next, these two ingots 10 and 10' are fixed onto the fixing base 14. As shown in FIG. 13A, the ingots 10 and 10' are arranged so that the end face 10*f* of one ingot 10 on which its low-quality crystal portion 10*e* is not located faces the end face 10*f'* of the other ingot 10' on which its low-quality crystal portion 10*e'* is not located. Also, the distance from the boundary between the body portion 10*a* and low-quality crystal portion 10*e'* of the ingot 10' to the boundary between the body portion 10*a'* and low-quality crystal portion 10*e'* of the ingot 10' is set to be R1. In this case, the interval between their end faces 10*f* and 10*f'* is S1. In this embodiment, the lengths of the respective low-quality crystal portions 10*e* and 10*e'* of the ingots 10 and 10' may be different from each other, so may be the lengths of their body portions 10*a* and 10*a'*. As will be described below, the distance R1 and the interval S1 are determined by the gap between two cutting parts which are located at both ends of the first cutting web 51*r* of the multi-wire saw.

Figure 13B:
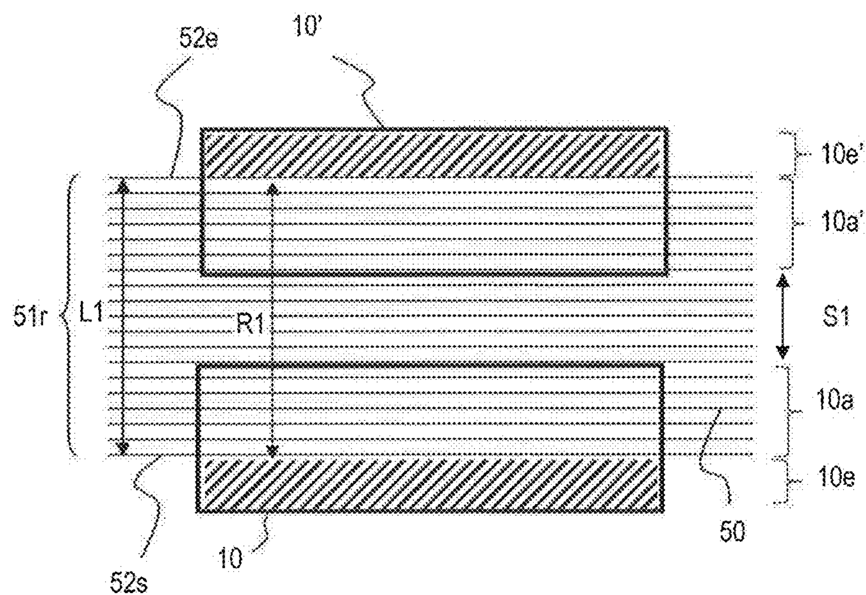
FIG. 13B Shows another relative arrangement of first and second cutting webs of a saw wire and two ingots in the third embodiment.

Next, the step of slicing the ingots 10 and 10' will be described. As shown in FIG. 13B, the saw wire 50 has a first cutting web 51*r* including a plurality of cutting parts which are arranged parallel to each other at regular intervals between the rollers.

As shown in FIG. 13B, the length of the first cutting web 51*r* as measured parallel to the axis of the rollers is L1 as in the first embodiment. That is to say, the interval between the cutting parts 52*s* and 52*e* which are located at both ends of the first cutting web 51*r* is also L1. The distance R1 is set to be equal to or greater than this interval L1 (i.e., so as to satisfy R1≥L1). Thus, the respective low-quality crystal portions 10*e* and 10*e'* of the ingots 10 and 10' are located outside of the first cutting web 51*r* as shown in FIG. 13B. If R1 is set to be equal to L1 (i.e., if R1=L1), then the largest number of wafers can be obtained and the ingots can be cut efficiently without leaving any uncut parts of the body portions 10*a* and 10*a'*. On the other hand, if R1 is set to be greater than L1 (i.e., if R1>L1), the ingots 10 can be cut with some uncut parts of the body portions 10*a* and 10*a'* left on the low-quality crystal portions 10*e* and 10*e'*. Those uncut parts of the body portions 10*a* and 10*a'* left on the low-quality crystal portions 10*e* and 10*e'* can be used as test pieces to check out the crystal quality of the ingots 10. As a result, parts of the body portions 10*a* and 10*a'* can be used to make production and quality managements.

By moving the fixing base 14 after the ingots 10 and 10' that are arranged at the positions described above have been fixed onto the fixing base 14 and after the ingots 10 and 10' supported on the fixing base have been arranged at the positions described above with respect to the first cutting web 51*r*, single-crystal silicon carbide wafers can be manufactured by slicing just the respective body portions 10*a* and 10*a'* of the ingots 10 and 10' without cutting their low-quality crystal portions 10*e* and 10*e'*.

As already described for the first embodiment, during the slicing process, the depth of the roller groove to receive the saw wire's cutting part 52*s* that is located closest to the low-quality crystal portion 10*e* of the ingot 10 in the first cutting web 51*r* and the depth of the roller groove to receive the saw wire's cutting part 52*e* that is located closest to the low-quality crystal portion 10*e'* of the ingot 10' in the first cutting web 51*r* are suitably measured and managed. When the variation in the depth of the roller grooves to receive the cutting parts 52*a* or 52*e* becomes three times or twice as large as the variation in the depth of a groove around the central region, the saw wire is unwound from those grooves so that the worn grooves will not be used anymore.

Figure 13C:
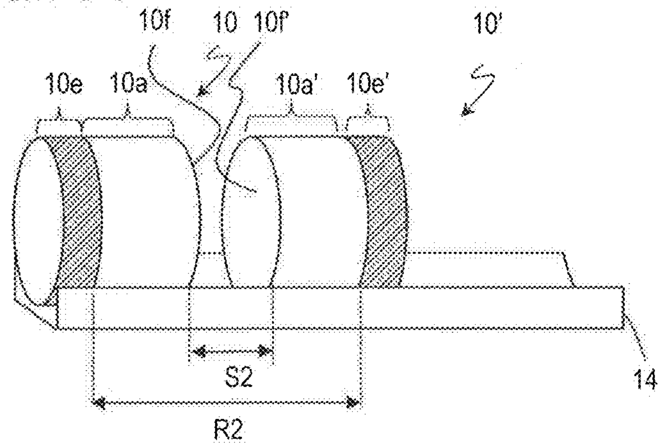
FIG. 13C A perspective view illustrating another state where two ingots have been fixed onto a fixing base in the third embodiment.
Figure 13D:
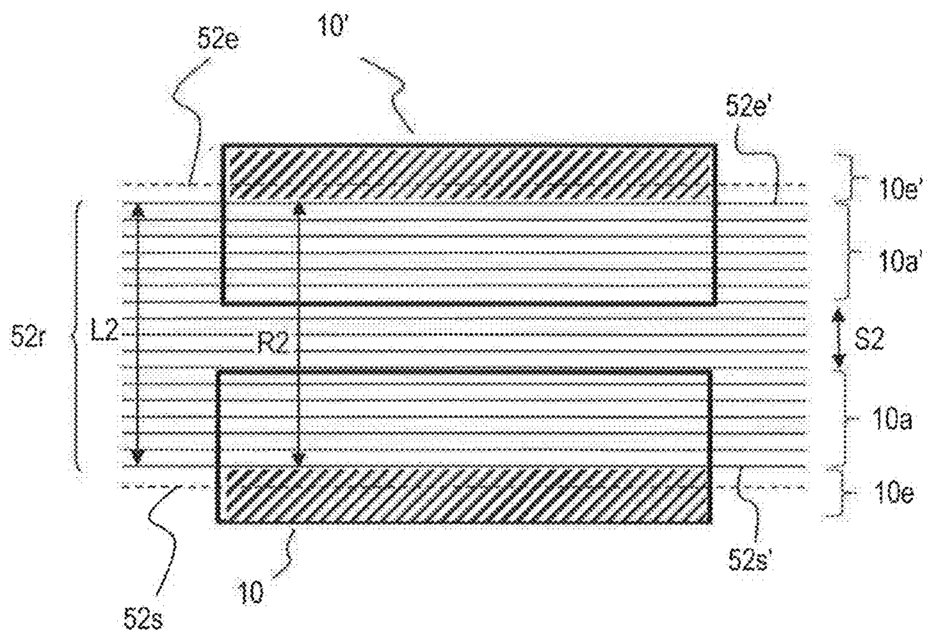
FIG. 13D Shows another relative arrangement of first and second cutting webs of a saw wire and two ingots in a fourth embodiment.

FIG. 13C illustrates the arrangement of the ingots 10 and 10' in a situation where the ingots 10 and 10' continue to be sliced with a multi-wire saw in which a first cutting web 52*r* has been redefined by unwinding the cutting parts 52*s* and 52*e* of the saw wire 50 (indicated by the dotted lines) from the grooves as shown in FIG. 13D in the first cutting web 51*r* shown in FIG. 13B. Although the cutting parts 52*s* and 52*e* (indicated by the dotted lines) are supposed to be unwound in the example illustrated in FIG. 13D, only one of these two cutting parts 52*s* and 52*e* may be unwound from the groove based on the result of the management described above.

In this case, the ingots 10 and 10' are arranged so that the end face 10*f* of one ingot 10 on which its low-quality crystal portion 10*e* is not located faces the end face 10*f'* of the other ingot 10' on which its low-quality crystal portion 10*e'* is not located. Also, the distance from the boundary between the body portion 10*a* and low-quality crystal portion 10*e* of the ingot 10 to the boundary between the body portion 10*a'* and low-quality crystal portion 10*e'* of the ingot 10' is set to be R2. In this case, the interval between their end faces 10*f* and 10*f'* is S2. R2 and S2 are shorter than R1 and S1, respectively. That is to say, the ingots 10 and 10' are arranged with the interval between the respective end faces 10*f* and 10*f'* shortened.

As shown in FIG. 13D, the first cutting web 52*r* is defined with the cutting parts 52*s* and 52*e* of the saw wire 50 unwound, and its length as measured parallel to the axis of the rollers (i.e., the interval between cutting parts 52*s'* and 52*e'* which are now located at both ends of the first cutting web 52*r*) is L2. The distance R2 is set to be equal to or greater than this interval L2 In this case, R2 may also be set to be equal to L2 to obtain as large a number of wafers as possible.

The length of the first cutting web 52*r* as measured parallel to the axis of the rollers has become shorter because the saw wire 50 has been unwound from the grooves at both ends of the rollers. Even so, however, by shortening the interval between the ingots 10 and 10', the ingots 10 and 10' can also be arranged with respect to the first cutting web 52*r* of the saw wire without allowing any extra parts of the body portions 10*a* and 10*a'* to be located outside of the first cutting web 52*r*.

By moving the fixing base 14 with the ingots 10 and 10' arranged at such positions, single-crystal silicon carbide wafers can be manufactured by slicing only the body portions 10*a* and 10*a'* of the ingots 10 and 10' simultaneously without cutting their low-quality crystal portions 10*e* and 10*e'* or cutting off any extra parts of their body portions 10*a* and 10*a'*.

Furthermore, in a situation where the interval between the end faces 10*f* and 10*f'* is greater than the interval between those cutting parts of the saw wire, even if the saw wire is unwound from more grooves, the body portions 10*a* and 10*a'* of the ingots 10 and 10' can also be sliced simultaneously and single-crystal silicon carbide wafers can be manufactured by shortening the interval between the ingots 10 and 10'.

Although embodiments of the present invention have been described, those are just examples of the present invention and various modifications can be readily made on those embodiments. For example, in the second embodiment described above, two ingots are fixed onto the fixing base and are cut with a wire saw including a saw wire with two cutting webs. However, three or more ingots may be fixed there and may be cut with a wire saw including a saw wire with three or more cutting webs which are arranged at predetermined intervals. In that case, the two or more intervals between those cutting webs may be different from each other.

Also, in the embodiments described above, the depths of roller grooves to receive the saw wire's cutting parts which are located closest to the low-quality crystal portions of the ingots are supposed to be measured and managed. However, the variation d3 in the depth of roller grooves to receive the saw wire's cutting parts that are second closest to the low-quality crystal portions from their initial value may also be managed as already described for the first embodiment. In that case, the depth may be managed so that if d2≥3d1 and d3<2d1 are satisfied, the saw wire is unwound from only the outermost grooves and that if d2≥3d1 and d2≥2d1 are satisfied, the saw wire is unwound from the outermost and second outermost grooves.

Examples

The present inventors cut an ingot of silicon carbide by the method of the first embodiment. The results will be described below. The ingot had a diameter of 3 inches and was cut by the loose abrasive method. The machines and materials used are as follows:

Multi-wire saw: multi-wire saw MWS-34 produced by Takatori Corporation;

Piano wire: piano wire with Φ of 0.16 produced by Japan Fine Steel Co., Ltd.;

Slurry's base solution: PS-L-40 produced by Palace Chemical Co., Ltd.; and

Diamond abrasive particles: abrasive particles with a particle size of 3 to 30 μm were used to make diamond slurry To confirm the effects achieved by the embodiments, an ingot with a low-quality crystal portion had its body portion cut a number of times with the condition changed, and the frequencies of occurrence of wire saw snapping were measured in respective situations. The following Table 1 summarizes the cutting conditions and the frequencies of occurrence of wire snapping.

In Table 1, "was cutting low-quality crystal portion avoided?" indicates whether or not cutting the low-quality crystal portion was avoided intentionally. If the answer is YES, the ingot was moved so that the low-quality crystal portion 10*e* was located outside of the cutting web as shown in FIG. 5 and the low-quality crystal portion 10*e* was not cut.

Also, "was rollers' rotational runout controlled?" indicates whether or not measurements and change of the saw wire winding positions on the rollers were carried out to reduce the rollers' rotational runout to 50 μm or less. If the answer is YES, the rotational runout control was carried out. But if the answer is NO, no rotational runout control was carried out.

Furthermore, "was groove management carried out?" indicates whether or not management was carried out to stop using worn grooves if the wear of the outermost grooves became 300% or more of the wear of the grooves in the stationary portion. If the answer is YES, the management was carried out. But if the answer is NO, no management was carried out.

Frequency of occurrence of wire snapping indicates the number of times of wire saw snapping that occurred per 100 hours of operation.

The ingot was cut by Cutting Methods A to C in which these conditions were combined in three different ways to obtain the frequencies of occurrence of wire snapping during the respective cutting processes.

TABLE 1

| Examples | | A | B | C |
|---|---|---|---|---|
| Cutting condition | Was cutting low-quality crystal portion avoided? | YES | YES | YES |
| | Was rollers' rotational runout controlled? | NO | YES | YES |
| | Was groove management carried out? | YES | NO | YES |
| Evaluation | Frequency of occurrence of wire snapping | 7.1 | 1.9 | 0.3 |

As shown in Table 1, the frequency of occurrence of wire snapping in Cutting Method C was approximately one-sixth of the one in Cutting Method B. Thus, it can be seen that by managing the degree of wear of the outermost groove, the frequency of occurrence of wire snapping can be reduced significantly.

Also, the ingot for use in Cutting Methods A to C had a low-quality crystal portion at one end of its body portion. That is why compared to a situation where both ends of epitaxially grown silicon carbide should be cut and/or ground, the ingot could be prepared in a much shorter time. Specifically, according to this example, the ingot could be prepared in two-thirds to one half as long a time as in a situation where both ends should be cut and/or ground. Thus, the present inventors confirmed that the time it would take to manufacture single-crystal silicon carbide wafers could be shortened according to this embodiment compared to a situation where low-quality crystal portions should be removed in advance.

Figure 14:
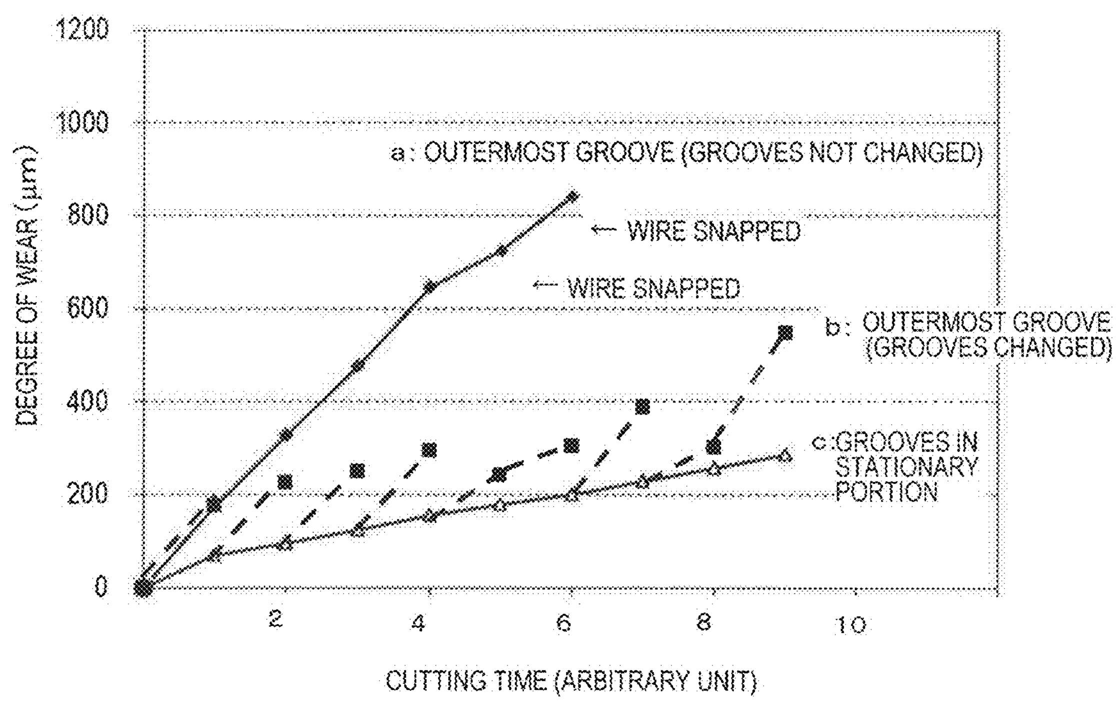
FIG. 14 Shows how the degree of wear of grooves changes with the time of use in an example.

FIG. 14 shows the degree of wear of the outermost groove in a situation where the ingot was cut by the method of this example (which is represented by the line graph b). For the purpose of comparison, also shown in FIG. 14 are the degree of wear of grooves in the stationary portion (as represented by the line graph c) and the degree of wear of the outermost groove in a situation where the ingot continued to be cut without unwinding the saw wire from that groove (as represented by the line graph a). The abscissa indicates the regular time interval.

As shown in FIG. 14, every time the degree of wear of the outermost groove was measured at regular time intervals, the degree of wear of the outermost groove was more than three times as large as the degree of wear in the stationary portion. That is why every time the degree of wear was measured, the saw wire was unwound from the outermost groove, the position of the ingot was changed so that the outermost cutting part of the saw wire was wound around the second outermost groove, and then the cutting process was continued. When the measurement was done for the fifth and eighth times, however, the degree of wear of the outermost groove was not more than three times as large as the degree of wear in the stationary portion. Thus, the cutting process was continued without unwinding the saw wire from the outermost groove then.

If the cutting process was carried on in this manner, the saw wire did not snap until the measurement was done for the ninth time.

On the other hand, if the cutting process was continued without unwinding the saw wire from the outermost groove, the outermost groove got more and more worn with time, and eventually the saw wire snapped in the interval between the fourth and fifth measurements. Even if the cutting process was continued with the saw wire rewound, the saw wire also snapped in the interval between the fifth and sixth measurements.

These results reveal that by managing the degree of wear of the outermost groove, the saw wire can be prevented from snapping.

Figure 15A:
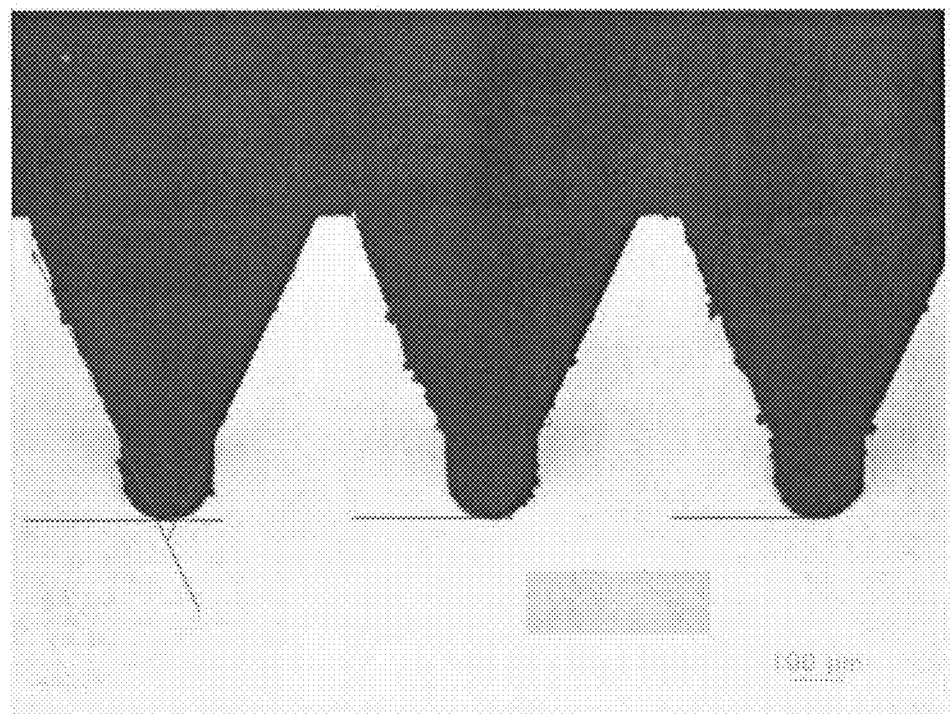
FIG. 15A Shows a cross section of a central portion of a roller which was used to cut an ingot in an example with the rotational runout of the roller controlled.
Figure 15B:
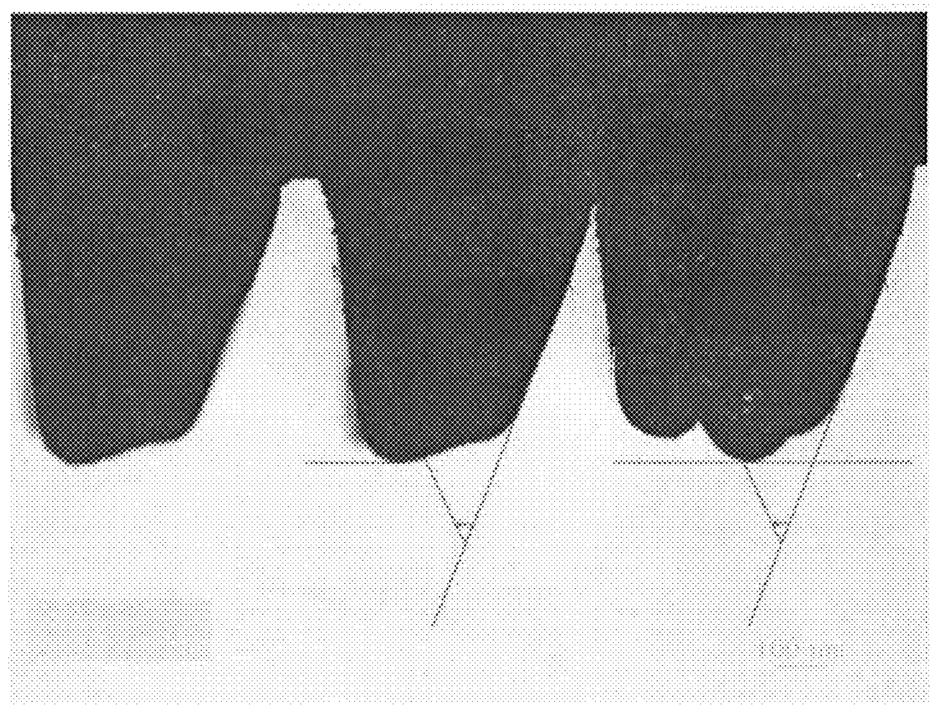
FIG. 15B Shows a cross section of a central portion of a roller which was used to cut an ingot in an example with the rotational runout of the roller not controlled.

FIGS. 15A and 15B show respective cross sections of a central portion of a roller which was used to cut an ingot for a predetermined period of time with its rotational runout controlled and not controlled, respectively. As shown in FIG. 15A, when the rotational runout of the roller was controlled, the saw would have run along the bottom of the grooves without changing its position, and therefore, the bottom of the grooves did not expand. As a result, the pitch between the grooves did not change and the thicknesses of the wafers sliced off did not vary easily.

On the other hand, as shown in FIG. 15B, when the rotational runout was not controlled, the saw wire would have run along the bottom of the grooves while changing its position gradually, thus widening the bottom of the grooves and getting the side surface of the grooves worn and retracted, too. As a result, the grooves got expanded as a whole and their pitch varied significantly. Consequently, the thicknesses of the wafers sliced off could vary significantly. These results reveal that by controlling the rotational runout of the roller, the single-crystal silicon carbide wafers sliced off from the ingot 10 can be prevented from coming to have varying thicknesses.

INDUSTRIAL APPLICABILITY

A method of cutting a high-hardness material with a multi-wire saw according to the present disclosure can be used effectively to slice an ingot of single-crystal silicon carbide which has been made to have any of various sizes by any of various crystal-growing methods.

REFERENCE SIGNS LIST

10, 10' ingot
10*a* body portion
10*b* low-quality crystal region
10*e* low-quality crystal portion
10*f* end face
10*s* side surface
11 seed crystal
12 silicon carbide
14 fixing base
50 saw wire
51*a*, 51*b*, 51*c* roller
51*r* first cutting web
51*r'* second cutting web
53 stage
51*g*, 51*g*1, 51*g*2, 51*gm*, 51*gn* groove

The invention claimed is:

1. A method of cutting a high-hardness material with a multi-wire saw including a cutting web which is formed by winding a saw wire over at least two rollers a number of times and which includes a plurality of cutting parts that are strung parallel to each other at regular intervals between the at least two rollers, the method comprising the steps of:

(A) providing at least one ingot which includes a body portion with two ends and a low-quality crystal portion that is located at only one of the two ends of the body portion;

(B) fixing the at least one ingot onto a fixing base; and (C) slicing the at least one ingot having the low-quality crystal portion by arranging the at least one ingot with respect to the saw wire so that the cutting web does not contact with the low-quality crystal portion of the at least one ingot but does contact with the body portion of the at least one ingot, wherein each of the at least two rollers has a plurality of grooves to receive the saw wire in the cutting web, and the method further includes the step of measuring respective variations d1 and d2 in the depth of first and second grooves of the at least two rollers from their initial values, and if d2 is three times or more as large as d1, unwinding the saw wire from the second groove to form a new cutting web, the first groove being located in the vicinity of the center of the cutting web in the axial direction of the two rollers, the second groove receiving a cutting part of the saw wire that is located closest to the low-quality crystal portion of the at least one ingot.

2. The method of claim 1, comprising adjusting a rotational runout of the at least two rollers to 50 μm or less.

3. A method of cutting a high-hardness material with a multi-wire saw including a cutting web which is formed by winding a saw wire over at least two rollers a number of times and which includes a plurality of cutting parts that are strung parallel to each other at regular intervals between the at least two rollers, the method comprising the steps of:

(A) providing first and second ingots each of which includes a body portion with two ends and a low-quality crystal portion that is located at only one of the two ends of the body portion;

(B) fixing the first and second ingots onto a fixing base so that their end lacking the low-quality crystal portions face each other;

(C) slicing the first and second ingots having the low-quality crystal portion by arranging the first and second ingots with respect to the saw wire so that the cutting web does not contact with the low-quality crystal portion of any of the first and second ingots but does contact with the body portions of the first and second ingots; and (D) measuring respective variations d1, d2 and d2' in the depth of first, second and third grooves of the at least two rollers from their initial values, and if at least one of d2 and d2' is three times or more as large as d1, unwinding the saw wire from its associated groove to form a new cutting web, the first groove being located in the vicinity of the center of the cutting web in the axial direction of the two rollers, the second groove receiving a cutting part of the saw wire that is located closest to the first ingot's low-quality crystal portion in the cutting web of the saw wire, the third groove receiving a cutting part of the saw wire that is located closest to the second ingot's low-quality crystal portion in the cutting web of the saw wire.

4. The method of claim 3, wherein the step (B) includes arranging the second ingot with respect to the first ingot so that the distance from the boundary between the body and low-quality crystal portions of the first ingot to the boundary between the body and low-quality crystal portions of the second ingot becomes equal to or longer than the interval between two cutting parts that are located at two ends of the cutting web of the multi-wire saw.

5. A method of cutting a high-hardness material with a multi-wire saw including a cutting web and an additional cutting web spaced apart from the cutting web with a predetermined gap left between them, each of the cutting web and the additional cutting web is formed by winding a saw wire over at least two rollers a number of times and which includes a plurality of cutting parts that are strung parallel to each other at regular intervals between the at least two rollers, the method comprising the steps of:

(A) providing first and second ingots each of which includes a body portion with two ends and a low-quality crystal portion that is located at only one of the two ends of the body portion;

(B) fixing the first and second ingots onto a fixing base so that the end of the first ingot lacking the low-quality crystal portion faces the low-quality crystal portion of the second ingot; and (C) slicing the first and second ingots having the low-quality crystal portion by arranging the at least one ingot with respect to the saw wire so that the cutting web and the additional cutting web do not contact with the low-quality crystal portion of any of the first and second ingots but do contact with their body portion, wherein each of the at least two rollers has a plurality of grooves to receive the saw wire in the cutting web and in the additional cutting web, and the method further includes the step of measuring respective variations d1, d2 and d2' in the depth of first, second and third grooves of the at least two rollers from their initial values, and if at least one of d2 and d2' is three times or more as large as d1, unwinding the saw wire from its associated groove to form at least one new cutting web, the first groove being located in the vicinity of the center of the cutting web in the axial direction of the two rollers, the second groove receiving a cutting part of the saw wire that is located closest to the first ingot's low-quality crystal portion in the cutting web of the saw wire, the third groove receiving a cutting part of the saw wire that is located closest to the second ingot's low-quality crystal portion in the additional cutting web of the saw wire.

6. The method of claim 5, wherein the step (B) includes arranging the second ingot with respect to the first ingot so that the distance from the end of the first ingot lacking the low-quality crystal portion to the boundary between the low-quality crystal and body portions of the second ingot agrees with the predetermined gap of the saw wire.

7. The method of claim 5, wherein the predetermined gap of the saw wire is determined so as to agree with the distance from the end of the first ingot lacking the low-quality crystal portion to the boundary between the low-quality crystal and body portions of the second ingot.

8. A method of cutting a high-hardness material with a multi-wire saw including a cutting web which is formed by winding a saw wire over at least two rollers a number of times and which includes a plurality of cutting parts that are strung parallel to each other at regular intervals between the at least two rollers, the method comprising the steps of:

(A) providing at least one ingot which includes a body portion with two ends and a low-quality crystal portion that is located at only one of the two ends of the body portion;

(B) fixing the at least one ingot onto a fixing base; and (C) slicing the at least one ingot having the low-quality crystal portion by arranging the at least one ingot with respect to the saw wire so that the cutting web does not contact with the low-quality crystal portion of the at least one ingot but does contact with the body portion of the at least one ingot, wherein each of the at least two rollers has a plurality of grooves to receive the saw wire in the cutting web, and the method further includes the step of measuring respective variations d1 and d2 in the depth of first and second grooves of the at least two rollers from their initial values, and if d1 and d2 are satisfied with a predetermined condition, unwinding the saw wire from the second groove to form a new cutting web, the first groove being located in the vicinity of the center of the cutting web in the axial direction of the two rollers, the second groove receiving a cutting part of the saw wire that is located closest to the low-quality crystal portion of the at least one ingot.

9. A method of cutting a high-hardness material with a multi-wire saw including a cutting web which is formed by winding a saw wire over at least two rollers a number of times and which includes a plurality of cutting parts that are strung parallel to each other at regular intervals between the at least two rollers, the method comprising the steps of:

(A) providing first and second ingots each of which includes a body portion with two ends and a low-quality crystal portion that is located at only one of the two ends of the body portion;

(B) fixing the first and second ingots onto a fixing base so that their end lacking the low-quality crystal portions face each other;

(C) slicing the first and second ingots having the low-quality crystal portion by arranging the first and second ingots with respect to the cutting web so that the saw wire in the cutting web does not contact with the low-quality crystal portion of any of the first and second ingots but does contact with the body portions of the first and second ingots; and (D) measuring respective variations d1, d2 and d2' in the depth of first, second and third grooves of the at least two rollers from their initial values, and if d1 and at least one of d2 and d2' are satisfied with a predetermined condition, unwinding the saw wire from its associated groove to form a new cutting web, the first groove being located in the vicinity of the center of the cutting web in the axial direction of the two rollers, the second groove receiving a cutting part of the saw wire that is located closest to the first ingot's low-quality crystal portion in the cutting web of the saw wire, the third groove receiving a cutting part of the saw wire that is located closest to the second ingot's low-quality crystal portion in the cutting web of the saw wire.

10. A method of cutting a high-hardness material with a multi-wire saw including a cutting web and an additional cutting web spaced apart from the cutting web with a predetermined gap left between them, each of the cutting web and the additional cutting web is formed by winding a saw wire over at least two rollers a number of times and which includes a plurality of cutting parts that are strung parallel to each other at regular intervals between the at least two rollers, the method comprising the steps of:

(A) providing first and second ingots each of which includes a body portion with two ends and a low-quality crystal portion that is located at only one of the two ends of the body portion;

(B) fixing the first and second ingots onto a fixing base so that the end of the first ingot lacking the low-quality crystal portion faces the low-quality crystal portion of the second ingot; and (C) slicing the first and second ingots having the low-quality crystal portion by arranging the at least one ingot with respect to the saw wire so that the cutting web and the additional cutting web do not contact with the low-quality crystal portion of any of the first and second ingots but do contact with their body portion, wherein each of the at least two rollers has a plurality of grooves to receive the saw wire in the cutting web and in the additional cutting web, and the method further includes the step of measuring respective variations d1, d2 and d2' in the depth of first, second and third grooves of the at least two rollers from their initial values, and if d1 and at least one of d2 and d2' are satisfied with a predetermined condition, unwinding the saw wire from its associated groove to form at least one new cutting web, the first groove being located in the vicinity of the center of the cutting web in the axial direction of the two rollers, the second groove receiving a cutting part of the saw wire that is located closest to the first ingot's low-quality crystal portion in the cutting web of the saw wire, the third groove receiving a cutting part of the saw wire that is located closest to the second ingot's low-quality crystal portion in the additional cutting web of the saw wire.

* * * * *